United States Patent [19]

Kelsey

[11] Patent Number: 5,369,195
[45] Date of Patent: Nov. 29, 1994

[54] POLYMERIZATION OF CYCLIC OLEFINS

[75] Inventor: Donald R. Kelsey, Fulshear, Tex.

[73] Assignee: Shell Oil Company, Houston, Tex.

[21] Appl. No.: 973,934

[22] Filed: Nov. 9, 1992

Related U.S. Application Data

[63] Continuation of Ser. No. 770,749, Oct. 3, 1991, abandoned, which is a continuation of Ser. No. 548,445, Jul. 5, 1990, abandoned, which is a continuation of Ser. No. 278,101, Nov. 30, 1988, abandoned.

[51] Int. Cl.$^5$ .................. C08F 4/608; C08F 36/20
[52] U.S. Cl. ..................... 526/119; 502/117; 526/133; 526/283
[58] Field of Search ................... 526/133, 119

[56] References Cited

U.S. PATENT DOCUMENTS

| | | | |
|---|---|---|---|
| 2,922,782 | 1/1960 | Hay | 526/133 |
| 3,627,739 | 12/1971 | Devlin et al. | 260/88.20 |
| 3,631,010 | 12/1971 | Witte et al. | 526/143 |
| 3,708,556 | 1/1973 | Nutzel et al. | 526/143 |
| 3,901,866 | 8/1975 | Lehnert et al. | 526/133 |
| 3,939,136 | 2/1976 | Zimmermann et al. | 526/133 |
| 4,020,260 | 4/1977 | Shiozaki et al. | 526/237 |
| 4,179,550 | 12/1979 | Miyamoto et al. | 526/212 |
| 4,360,628 | 11/1982 | Runavot et al. | 524/508 |
| 4,395,578 | 7/1983 | Larkin | 585/10 |
| 4,508,842 | 4/1985 | Beran et al. | 502/112 |
| 4,622,309 | 11/1986 | Coleman et al. | 526/142 |
| 4,696,985 | 9/1987 | Martin | 526/119 |
| 4,729,976 | 3/1988 | Sjardijn et al. | 526/283 |
| 4,835,230 | 5/1989 | Khasat et al. | 526/221 |
| 4,861,848 | 8/1989 | Basset et al. | 526/169 |
| 4,943,621 | 7/1990 | Janda et al. | 526/133 |

FOREIGN PATENT DOCUMENTS

| | | | |
|---|---|---|---|
| 269948 | 6/1988 | European Pat. Off. | 526/127 |
| 47-18992 | 9/1972 | Japan | 526/133 |
| 846731 | 8/1960 | United Kingdom | 526/133 |
| 851119 | 10/1960 | United Kingdom | 526/133 |
| 1044777 | 10/1966 | United Kingdom | 526/166 |

Primary Examiner—Edward J. Smith

[57] ABSTRACT

A catalyst and process for the polymerization of cyclic olefins, such as dicyclopentadiene, are disclosed. The catalyst includes a transition metal compound, a co-catalyst and a boron halide promoter. Polymerization can be carried out in a reaction injection molding process to prepare a thermoset molded article having high Tg and superior flexural strength.

29 Claims, No Drawings

POLYMERIZATION OF CYCLIC OLEFINS

This is a continuation of application Ser. No. 770,749, filed Oct. 3, 1991, now abandoned, which is a continuation of Ser. No. 548,445, filed Jul. 5, 1990 now abandoned, which was a continuation of Ser. No. 278,101, filed Nov. 30, 1988 now abandoned.

BACKGROUND OF THE INVENTION

This invention relates to the polymerization of cyclic olefins. In one embodiment, the invention relates to a catalyst for the reaction injection molding of dicyclopentadiene. In another aspect, the invention relates to a dicyclopentadiene polymer having superior flexural strength.

Cyclic olefins are subject to ring-opening metathesis polymerization to produce thermoset polymers having physical properties making them suitable for structural and electronic applications, such as molded car parts and electrical laminates. Such polymerizations are commonly carried out in reaction injection molding (RIM) processes, in which the metathesis catalyst and the monomer are charged to a heated mold and polymerization of the monomer and forming of the polymer into the desired shape are carried out simultaneously in the mold.

In such RIM processes, it is important that the polymerization reaction occur rapidly and with as complete incorporation of the charged monomers as possible. It has been found in molding polydicyclopentadiene, for example, that the presence of unreacted monomers results in a molded part having a very unpleasant odor and less than optimum physical properties, in commercial RIM processes, it is economically desirable that the process be carried out in as short a cycle time as possible and at starting mold temperatures at or near room temperature. It is also advantageous to be able to use an impure monomer stream and thus avoid extensive purification of the monomer prior to polymerization.

One metathesis catalyst system which has been successfully used in RIM processes is the combination of a phenol-treated transition metal salt, such as $WOCl_4$ or $WCl_6$, and a co-catalyst such as an aluminum or tin compound. In particular, a phenol-substituted tungsten combined with a tin hydride has been found highly efficient for monomer incorporation into the polymer. This catalyst also is highly active in a relatively impure dicyclopentadiene feed stream. It would be desirable to further reduce the cycle time and polymerization temperature for RIM processes catalyzed by this and other transition metal catalysts. It would also be desirable to reduce the amount of the costly tungsten and tin components of the catalyst without sacrificing catalyst activity. It would further be desirable to improve the properties, such as flexural strength, of a dicyclopentadiene polymer.

It is therefore an object of this invention to provide an improved catalyst for the polymerization of cyclic olefins. In one embodiment, it is an object of the invention to provide a reaction injection molding process in which dicyclopentadiene is polymerized rapidly at relatively low mold temperatures. In a further embodiment, it is an object of the invention to provide a dicyclopentadiene polymer having superior flexural strength.

BRIEF DESCRIPTION OF THE INVENTION

According to the invention, a process and catalyst for the polymerization of cyclic olefins are provided, wherein a cyclic olefin is polymerized in the presence of a catalyst comprising (a) a transition metal compound, (b) a co-catalyst, and (c) a boron halide compound. The polymerization is preferably carried out in the presence of an organo tin hydride or organo aluminum co-catalyst. In a specific embodiment, the invention process involves the use of an aryloxy-substituted tungsten halide or oxyhalide, a tin hydride co-catalyst and a boron trifluoride promoter for the reaction injection molding of dicyclopentadiene. The invention catalyst and process enable the rapid polymerization of dicyclopentadiene at relatively low mold temperatures or relatively low levels of the catalyst and cc-catalyst, and enable the production of dicyclopentadiene polymers having excellent properties.

DETAILED DESCRIPTION OF THE INVENTION

The Catalyst

The polymerization catalyst includes a transition metal compound. The transition metal is preferably, because of the high activity of the resulting catalyst for dicyclopentadiene polymerization, molybdenum or tungsten. The transition metal compound (or starting material therefor) is generally in the form of a salt, including such salts as halides, including oxyhalides. Suitable halides include chloride, bromide and fluoride. The transition metal halide is preferably one in which the halide is present in a molar amount of at least three atoms per atom of transition metal. Examples of such transition metal halides include molybdenum oxytetrachloride, molybdenum oxytrichloride, molybdenum trioxyhexachloride, molybdenum trioxypentachloride, molybdenum oxytetrafluoride, tungsten hexachloride, tungsten oxytetrachloride, and tungsten oxytetrabromide. The preferred transition metal compounds, because of their high activity for dicyclopentadiene polymerization, are tungsten hexachloride, tungsten oxytetrachloride, molybdenum oxytrichloride, and mixtures thereof. The transition metal compound will generally be present in the polymerization reaction mixture in an amount of from about 0.001 to about 5, preferably from about 0.005 to about 1, most preferably from about 0.01 to about 0.1 mole percent, based on moles of cyclic olefin monomer present.

The transition metal compound preferably includes the reaction product of the above transition metal salt with an alcohol or phenol for solubilization and enhanced activity of the transition metal salt. The solubilizing compound can be, for example, phenol or an aryl- or alkyl-substituted phenol such as o-, m- and p-cresol; 2-, 3- and 4-ethylphenol; 2-, 3- and 4-propylphenol; 2-, 3- and 4-isopropylphenol; 2-, 3- and 4-butylphenol; 2-, 3- and 4-tertbutylphenol; 2-, 3- and 4-phenylphenol; 2,4- and 2,6-diisopropylphenol; 2,4- and 2,6-diisobutylphenol; 2,4- and 2,6-di-tertbutylphenol; 2,6-di-tertbutyl-4-methylphenol; 2,4- and 2,6-diphenylphenol. The phenol can be a halophenol such as, for example, 2-, 3- and 4-fluorophenol; 2,3-, 2,4-, 2,5-, 2,6-, 3,4- and 3,5-difluorophenol; 2,3,4-, 2,3,5-, 2,3,6-, 3,4,5-, 2,4,5- and 2,4,6-trifluorophenol; 2,3,4,5-, 2,4,5,6- and 2,3,5,6-tetrafluorophenol; pentafluorophenol; and the corresponding bromo- and chlorophenols. The phenol can be a haloalkyl-substituted phenol such as, for example, 3-trifluoromethylphenol, 2-trichloromethylphenol, 4-trifluoromethylphenol, 2-trifluoromethylphenol, 3-chlorodifluoromethylphenol, 3-dichlorofluoromethylphenol and 3-tribromomethylphenol. Suitable alcohols include, for example, ethanol, isopropanol, t-butanol, octadecanol and the like. Mixtures of such alcohols and phenols can also be used.

The phenol will generally be present in the catalyst in an amount of about 1 to about 3 moles per mole of the transition metal, preferably from about 1.5 to about 2.5 moles. The reaction product, or aryloxy-substituted transition metal compound, can be prepared, for example, by contacting, under an oxygen-free inert atmosphere, the alcoholic or phenolic compound and the transition metal compound in an inert organic liquid with mild heat and removal of generated hydrogen halide. Suitable inert organic liquids for the reaction include, for example, cyclopentane, cyclohexane, benzene, toluene, xylene, chlorobenzene and dichlorobenzene. The inert organic liquid is then preferably distilled off under vacuum, and the solid residue is dissolved in dry, degassed cyclic olefin monomer.

The Co-Catalyst

The catalyst component can be used in combination with one or more co-catalyst compounds. Such co-catalysts can include, for example, an organo aluminum compound, including trialkyl aluminum, alkylaluminum dihalides, dialkylaluminum halides, or alkyl(alkyloxy) aluminum halides, or an organo tin hydride compound, the latter including compounds which can be represented by the formula $Sn(R)_3H$, in which each R is selected independently from hydrogen, substituted or unsubstituted aryl, or $C_{1-20}$ alkyl. Specific examples of such co-catalysts include ethyl aluminum chloride, diethyl aluminum chloride, tributyl tin hydride, tripentyl tin hydride, diphenyl tin dihydride, trioctyl tin hydride, methyldicyclohexyl tin hydride, cyclopentyldimethyl tin hydride, triphenyl tin hydride and phenyldimethyl tin hydride. Substituents on the R groups in the above formula can include, for example, $C_{1-20}$ alkoxy and halides.

The amount of the co-catalyst present in the catalyst composition will vary depending upon the specific components present and the reaction conditions. In general, a tin-containing co-catalyst will be present in a molar amount of from about 15:1 to about 1:1, preferably from about 8:1 to about 2:1, based on moles of transition metal in the catalyst, while an organo aluminum halide will generally be present in a molar ratio of about 8:1 to about 1:1.

The catalyst system may include a moderator to delay the initiation of polymerization if the selected catalyst and co-catalyst cause instant polymerization upon contact. Ethers, esters, ketones, nitriles and polar cyclic olefins are among suitable moderators for catalyst systems made up of tungsten catalysts and alkyl aluminum halide co-catalysts. Ethyl benzoate, butyl ether bis(2-methoxyethyl)ether and polar cyclic olefins are preferred moderators. Moderators are generally not necessary for catalyst systems having a tin hydride co-catalyst.

The Boron Promoter

The invention catalyst includes a boron halide promoter, including boron trihalides, boron trihalide complexes and tetrahaloborates. The promoter can be, for example, such boron halides as boron tribromide, boron trifluoride, boron trifluoride diethyl ether complex, boron trifluoride dibutyl ether complex, boron trifluoride ethylamine, tetrafluoroboric acid diethyl ether, methyl boron difluoride, phenyl boron dichloride, triphenylmethyl ammonium fluoroborate, tetrafluoroborate, bis(2-ethyl-1-hexyl)ammonium tetrafluoroborate, boron trichloride dimethylsulfide, boron trifluoride alcohol complexes, and the like. The boron compound will be present in the polymerization reaction mixture in an amount effective to promote polymerization of the cyclic olefin monomer, generally from about 0.001 to about 10 moles, preferably from about 0.05 to about 2 moles, per mole of transition metal. The presently-preferred boron halides, because of their high activity and stability, are boron trifluoride and its ethyl ether and butyl ether complexes.

Catalyst Preparation

The preferred catalyst composition of the invention includes an aryloxy-substituted tungsten or molybdenum oxychloride catalyst, optionally combined with an aryloxy-substituted tungsten hexachloride or molybdenum pentachloride, a tributyl or triphenyl tin hydride co-catalyst, and a boron trifluoride complex promoter. This catalyst has been found to exhibit high activity in the polymerization of dicyclopentadiene and high monomer conversion in a reaction injection molding process having a short induction time and relatively low polymerization temperature.

The above catalyst composition is preferably prepared by reacting about two moles of a substituted phenol with one mole of tungsten hexachloride or tungsten oxytetrachloride, or mixture thereof, in dry inert solvent such as toluene at a temperature within the range of about 25° to about 95° C. under oxygen-free argon. Hydrogen chloride by-product is swept out of the reaction and the toluene is distilled off under vacuum. The reaction product is conveniently dissolved in dry, degassed dicyclopentadiene or other liquid monomer to be polymerized, to make a solution about 2 to 10 weight percent in bisphenoxy tungsten compound, which can be diluted with additional monomer to achieve the desired concentration of catalyst. The tin co-catalyst is generally combined with the transition metal catalyst in the reaction mixture as a solution of the monomer to be polymerized. The boron halide promoter is generally combined with the transition metal and/or tin co-catalyst solution.

Polymerization

The polymerization process of the invention involves contacting one or more cyclic olefin monomers with the transition metal component in the presence of the co-catalyst and the boron halide promoter. Suitable cyclic olefin monomers and comonomers include those of the norbornene type which can be represented by the structural formulas

in which each R is selected independently from hydrogen, $C_{1-20}$ alkyl, $C_{1-20}$ alkenyl, aryl and, with R groups linked together through carbon atoms, saturated and unsaturated cyclic hydrocarbon groups. Included in such monomers and comonomers are dicyclopentadiene, norbornene, norbornadiene and 5-(2-propenyl)-norbornene. Commercial cyclic olefins are available at various levels of purity, ranging from about 92 to about 99.9, the upper purity ranges being the result of distillation and further treatment for removal of contaminants and olefins which would be co-polymerized under polymerization conditions. As a general rule, transition metal catalysts employing an alkyl aluminum compound as co-catalyst require a high-purity monomer for acceptable polymerization activity, while the use of a tin co-catalyst permits the use of lower purity, technical-grade (83–95%) dicyclopentadiene monomer. An advantage of the invention catalyst is that it is very active in relatively impure (90–95%) dicyclopentadiene.

The invention polymerization process is preferably carried out by reaction injection molding (RIM), in which a solution of the catalyst, preferably in the monomer liquid to be polymerized, is injected into a mold simultaneously with the monomer, in liquid form, to be polymerized. The catalyst is generally employed in a molar ratio of RIM monomer to transition metal (mole:mole) of from about 100:1 to about 12,000:1, preferably about 1000:1 to about 8000:1, most preferably about 2500:1 to about 7000:1.

In a preferred RIM polymerization technique, a stream of the transition metal catalyst component in the monomer to be polymerized and a monomer stream containing the tin co-catalyst are combined in the mixing head of a RIM machine just prior to injection of the combined stream into a mold. The boron compound is injected into the mixing head with the transition metal stream, with the co-catalyst stream, or in a separate monomer solution stream.

The initial mold temperature will generally be within the range of about 20° to about 130° C., preferably about 35° to about 100° C. The mold pressure is generally within the range of about 10 to about 50 psi. After injection of the catalyst and monomer into the mold, there is an interval of time, called the "induction time," before onset of a rapid exotherm from the exothermic polymerization reaction. In a commercial RIM process, this induction time should be sufficiently long to permit filling of the mold, but no longer than about 2 minutes, preferably less than thirty seconds. Once the polymerization reaction is initiated, polymerization should occur quite rapidly, usually within about 10 seconds to about 1 minute, and is accompanied by a rapid rise in temperature.

Various optional components can be present in the reaction mixture during polymerization, including solvents, fillers, anti-oxidants, flame retardants, blowing agents, stabilizers, foaming agents, pigments, plasticizers, reinforcing agents and impact modifiers. Particularly preferred is the addition of from about 1 to about 10 weight percent, based on the weight of the monomer, of an elastomer for impact modification of the polymer. These components are most conveniently added to the reaction as constituents of one or more of the reaction mixture streams, as liquids or as solutions in the monomer.

After the polymerization reaction is complete, the molded object may be subjected to an optional post-cure treatment at a temperature in the range of about 100° to about 300° C. for about 1 to 24, preferably about 1 to 2 hours. Such a post-cure treatment can enhance certain polymer properties, including glass transition temperature.

The Polymer

The invention process prepares a crosslinked dicyclopentadiene homopolymer or copolymer having excellent physical properties. The presently preferred polydicyclopentadiene product is a crosslinked polymer containing at least about 90 percent dicyclopentadiene monomer units and having a flexural strength of at least about 10,500 psi, preferably greater than about 11,500 psi, and a Tg of at least about 125° C. (DSC at 20° C./min). Polymer prepared in a reaction injection molding process using the invention catalyst has been found to have a high crosslink density and to exhibit a percent swell in toluene of less than about 200, often less than about 120%. The polymer is useful in applications such as structural composites, for example, in the automobile industry, and in electrical applications such as printed circuit boards.

EXAMPLES

Certain specific embodiments of the invention are described in the following examples, in which dicyclopentadiene was polymerized under laboratory-scale reaction injection molding conditions using a tungsten-based catalyst, a tin co-catalyst and a boron promoter. The aryloxy-substituted tungsten catalysts used in the examples were prepared by reacting tungsten hexachloride or tungsten oxytetrachloride or mixtures thereof with two equivalents or a slight excess of 2,6-diisopropylphenol in dry toluene at 25°–90° C. under oxygen-free, dry argon and, after the hydrogen chloride by-product had been swept from the reaction, distilling the toluene under vacuum. The residue was dissolved in dry, degassed dicyclopentadiene (about 93% purity containing up to 7% $C_9$ and $C_{10}$ olefins) to make a 5–8 weight percent solution (referred to as catalyst master solution). Described procedures were carried out in a nitrogen dry box or under purified argon atmosphere.

Example 1

A 30-mL dried serum bottle with a stir bar was charged with an amount of aryloxy-substituted tungsten hexachloride catalyst master solution to provide 0.059 mmol of tungsten catalyst, an amount of boron trifluoride etherate as a 0.5 weight % solution in dicyclopentadiene to provide 0.030 mmol of the boron compound, and additional dry, degassed dicyclopentadiene (93%) such that the total amount of dicyclopentadiene in the final polymerization mixture was 16 g. To this stirred solution was added by syringe a solution of 0.22 mmol tributyltin hydride in DCPD at room temperature. The mixture was stirred for 20–30 seconds at room temperature, and then placed in an oil bath at 90° C. The temperature near the center of the reaction mixture was monitored by means of a thermocouple probe. After about six seconds, at which time the temperature in the center of the reaction mixture had reached 40° C., a very rapid, exothermic polymerization occurred. After one minute in the bath, the internal temperature of the polymerizing mass had reached a maximum of 189° C. and had begun to decline gradually. These observations are tabulated in Table 1.

Examples 2–10

The polymerizations of Examples 2–10 and comparative Example A were conducted essentially as described in Example 1. In Example A, the boron trifluoride etherate was omitted, which resulted in a longer induction time, a higher induction temperature prior to onset of the exothermic polymerization, and a longer time to reach the maximum exothermic temperature compared to the polymerizations which employed boron trifluoride complex. Polymerization mixtures and observations are tabulated in Table 1.

Comparative Examples C and D were conducted in the absence of tin hydride. Comparative Example H employed a low level of tin hydride, which resulted in polymerization after a relatively long induction time. In the presence of boron trifluoride etherate (Examples 25 and 26), the induction time was improved substantially for reaction mixtures containing this low level of tin hydride. Examples 27–29 and Comparative Example I

TABLE 1
Polymerization of Dicyclopentadiene Using Aryloxy-substituted $WCl_6$ Catalyst

| Example | W comp. (mmol) | $BF_3(Et_2O)$ (mmol) | $But_3SnH$ (mmol) | Induction Time, min. | Induction T, °C. | Exotherm Maximum Time, min. | Exotherm Maximum T, °C. |
|---|---|---|---|---|---|---|---|
| 1 | 0.059 | 0.030 | 0.22 | 0.1 | 40 | 1.0 | 189 |
| A | 0.059 | — | 0.22 | 6.4 | 68 | 8.0 | 198 |
| 2 | 0.059 | 0.0062 | 0.22 | 3.8 | <100 | 5.2 | 194 |
| 3 | 0.059 | 0.0116 | 0.22 | 1.9 | 40 | 4.1 | 189 |
| 4 | 0.059 | 0.0124 | 0.22 | 1.4 | 47 | 2.1 | 208 |
| 5 | 0.059 | 0.015 | 0.22 | NR$^a$ | | | |
| 6 | 0.059 | 0.008 | 0.22 | 1.4 | 48 | 2.0 | 188 |
| 7 | 0.029 | 0.008 | 0.22 | 1.9 | 48 | 3.0 | 190 |
| 8 | 0.029 | 0.0124 | 0.11 | 1.4 | 33 | 2.8 | 196 |
| 9 | 0.029 | 0.015 | 0.11 | NR$^a$ | | | |
| 10 | 0.0196 | 0.015 | 0.22 | 3.1 | 42 | 4.3 | 203 |

$^a$Boron trifluoride etherate was combined with the tin hydride in DCPD and the combined solution was then immediately added to the solution of tungsten compound in DCPD; the mixture gelled but an exothermic polymerization did not occur because of incomplete solubility of these samples of boron trifluoride etherate.

Examples 11–37 and Comparative Examples B–K

The polymerizations shown in Table 2 were conducted essentially as in Example 1, except that the aryloxy-substituted tungsten catalyst was prepared from tungsten oxytetrachloride.

show that a Sn/W mol ratio of about 1:1 resulted in a very sluggish polymerization and a temperature rise not substantially above that of the heating bath, even in the presence of boron trifluoride. Examples 33 and 34 were conducted with dibutyl ether complex of boron trifluoride in place of the diethyl ether complex. Examples 35–37 were conducted with boron tribromide in place of boron trifluoride etherate.

TABLE 2
Polymerization of Dicyclopentadiene Using Aryloxy-substituted $WOCl_4$ Catalyst

| Example | W comp. (mmol) | $BF_3(Et_2O)$ (mmol) | $But_3SnH$ (mmol) | Induction Time, min. | Induction T, °C. | Exotherm Maximum Time, min. | Exotherm Maximum T, °C. |
|---|---|---|---|---|---|---|---|
| B | 0.059 | — | 0.22 | 3.6 | 53 | 5.1 | 203 |
| 11 | 0.059 | 0.0124 | 0.22 | 2.4 | 39 | 3.9 | 200 |
| 12 | 0.059 | 0.030 | 0.22 | 0.2 | 43 | 1.3 | 156 |
| 13 | 0.059 | 0.059 | 0.22 | 0.2 | 33 | 0.8 | 179 |
| 14 | 0.059 | 0.118 | 0.22 | 0.2 | 33 | 0.8 | 172 |
| C | 0.039 | 0.039 | — | NR | | | |
| D | 0.039 | 0.078 | — | NR | | | |
| E | 0.039 | — | 0.312 | 2.8 | 62 | 3.5 | 196 |
| 15 | 0.039 | 0.0098 | 0.312 | 2.5 | 46 | 3.2 | 187 |
| 16 | 0.039 | 0.0195 | 0.312 | 0.2 | 49 | 0.6 | 185 |
| F | 0.039 | — | 0.156 | 4.4 | 63 | 5.8 | 209 |
| 17 | 0.039 | 0.019 | 0.156 | 0.6 | 37 | 1.6 | 179 |
| 18 | 0.039 | 0.039 | 0.156 | 0.1 | 35 | 1.0 | 197 |
| G | 0.039 | — | 0.156 | 4.1 | 54 | 5.6 | 198 |
| 19 | 0.039 | 0.020 | 0.156 | 0.2 | 35 | 1.1 | 193 |
| 20 | 0.039 | 0.020 | 0.156 | 0.8 | 37 | 1.5 | 201 |
| 21 | 0.039 | 0.039 | 0.098 | 0.9 | 37 | 1.5 | 183 |
| 22 | 0.039 | 0.0098 | 0.233 | 2.3 | 38 | 3.4 | 198 |
| 23 | 0.039 | 0.0195 | 0.233 | 1.4 | 35 | 2.7 | 189 |
| 24 | 0.039 | 0.039 | 0.233 | 0.5 | 35 | 1.4 | 183 |
| H | 0.039 | — | 0.079 | 11.8 | 96 | 12.9 | 191 |
| 25 | 0.039 | 0.020 | 0.079 | 1.6 | 44 | 2.7 | 183 |
| 26 | 0.039 | 0.039 | 0.079 | 1.4 | 33 | 2.7 | 201 |
| I | 0.039 | — | 0.039 | NE | | | |
| 27 | 0.039 | 0.039 | 0.039 | NE | | | |
| 28 | 0.039 | 0.039 | 0.039 | NE | | | |
| 29 | 0.039 | 0.078 | 0.039 | NE | | | |
| 30 | 0.020 | 0.020 | 0.080 | 3.0 | 41 | 4.4 | 177 |
| 31 | 0.020 | 0.040 | 0.080 | 1.9 | 40 | 2.9 | 187 |
| J | 0.017 | — | 0.039 | NE | | | |
| 32 | 0.017 | 0.020 with $BF_3(But)_2O$ | 0.039 | 2.4 | 53 | 10.6 | 122 |
| 33 | 0.059 | 0.029 | 0.22 | <0.1 | 25 | 0.3 | 202 |
| 34 | 0.039 | 0.020 with $BBr_3$ | 0.156 | 0.7 | 33 | 1.5 | 194 |

TABLE 2-continued

Polymerization of Dicyclopentadiene Using Aryloxy-substituted WOCl4 Catalyst

| Example | W comp. (mmol) | BF3(Et2O) (mmol) | But3SnH (mmol) | Induction Time, min. | Induction T, °C. | Exotherm Maximum Time, min. | Exotherm Maximum T, °C. |
|---|---|---|---|---|---|---|---|
| K | 0.059 | — | 0.22 | 2.4 | 50 | 3.5 | 206 |
| 35 | 0.059 | 0.059 | 0.22 | 2.2 | 58 | 2.9 | 188 |
| 36 | 0.059 | 0.029 | 0.22 | 2.0 | 64 | 3.2 | 196 |
| 37 | 0.059 | 0.015 | 0.22 | 2.3 | 71 | 3.1 | 220 |

NE = no exothermic polymerization; gel formation.
NR = little or no polymerization apparent.

Examples 38–41 and Comparative Examples L–P

The polymerizations of these examples were carried out essentially as in Example 1, except that the aryloxy-substituted tungsten catalyst was prepared from a mixture of tungsten hexachloride and tungsten oxychloride in a mole ratio of 90/10. Example 38 was carried out with an ethylamine complex of boron trifluoride in place of the diethyl ether complex. Examples 39 and M were carried out with triphenyltin hydride in place of tributyltin hydride. Examples 40 and N were carried out with etetrabutyltin in place of tributyltin hydride. Examples 41 and P were carried out with bis(tributyltin) [hexabutylditin] in place of tributyltin hydride.

polymerization conducted with tungsten hexachloride and tributyltin hydride gelled but did not cause a temperature rise substantially above the temperature of the heating bath.

Examples 43–45

The polymerization was conducted similarly to that of Examples 11–32, except that, instead of combining the boron trifluoride etherate with the tungsten solution, the boron trifluoride was combined with the tributyltin hydride in dicyclopentadiene before addition to the tungsten compound. In Example 43, the solution containing boron trifluoride etherate and tributyltin hydride was prepared and used after one day. In Exam-

TABLE 3

Polymerization of Dicyclopentadiene Using Aryloxy-substituted WCl6/WOCl4 Catalyst

| Example | W comp. (mmol) | BF3(Et2O) (mmol) | But3SnH (mmol) | Induction Time, min. | Induction T, °C. | Exotherm Maximum Time, min. | Exotherm Maximum T, °C. |
|---|---|---|---|---|---|---|---|
| L | 0.059 | — | 0.22 | 3.0 | 97 | 3.8 | 202 |
| | | with BF3EtNH2 | | | | | |
| 38 | 0.059 | 0.063 | 0.22 | 1.9 | 57 | 2.5 | 208 |
| | | | with (Ph)3SnH | | | | |
| M | 0.059 | — | 0.353 | 3.4 | 53 | 4.2 | 227 |
| 39 | 0.059 | 0.059 | 0.353 | 0.2 | 26 | 0.9 | 185 |
| | | | with (C4H9)4Sn | | | | |
| N | 0.059 | — | 0.353 | NR | | | |
| 40 | 0.059 | 0.059 | 0.353 | NR | | | |
| | | | with [(C4H9)3Sn—]2 | | | | |
| P | 0.059 | — | 0.353 | NR | | | |
| 41 | 0.059 | 0.059 | 0.353 | NR | | | |

NE = no exothermic polymerization; gel formation.
NR = little or no polymerization apparent.

Example 42

A polymerization was conducted essentially as described in Example 1 with tungsten hexachloride (0.059 mmol) in place of the aryloxy-substituted tungsten compound, boron trifluoride etherate (0.059 mmol), and tributyltin hydride (0.354 mmol) in a total of 16 g dicyclopentadiene. After 5.9 minutes in the 90° C. bath, at which time the internal temperature of the polymerization mixture was 89°, an exothermic polymerization occurred which reached a maximum temperature of 134° C. after an additional 3.7 minutes. By comparison, when the boron trifluoride etherate was omitted, the ples 44 and 45, the solution was used in the polymerization after standing at room temperature for two weeks and six weeks, respectively.

TABLE 4

Polymerization of Dicyclopentadiene Using Aryloxy-substituted WOCl4 Catalyst

| Example | W comp. (mmol) | BF3(Et2O) (mmol) | But3SnH (mmol) | Induction Time, min. | Induction T, °C. | Exotherm Maximum Time, min. | Exotherm Maximum T, °C. |
|---|---|---|---|---|---|---|---|
| 43 | 0.059 | 0.027 | 0.219 | <0.1 | 25 | 0.4 | 190 |
| 44 | 0.059 | 0.027 | 0.219 | <0.1 | 27 | 0.9 | 195 |
| 45 | 0.059 | 0.027 | 0.219 | <0.1 | 32 | 1.6 | 208 |

Example 46

Using a laboratory-scale RIM molding apparatus, a poly(dicyclopentadiene) plaque was made by feeding equal volumes of two streams of DCPD monomer (93% purity), one stream containing bis(2,6-diisopropylphenoxy)tungsten oxydichloride catalyst and boron trifluoride butyl ether complex and the second stream containing tributyltin hydride such that the final molded part contained 4000:1 DCPD:tungsten catalyst, 4:1 tin hydride: tungsten catalyst, and 1:1 boron trifluoride: tungsten catalyst (mole/mole), to a static mixer and the combined streams immediately injected into a heated (100° C.) aluminum mold with an internal volume of about 7×10×½ inches. The mixing time and mold filling was accomplished within about 30 seconds, after which time an exotherm occurred within about another 30 seconds. After about 5 minutes, the polymer was removed from the mold. Physical tests showed the molded part to have a flexural modulus of 325,000 psi, a flexural strength of 12,200 psi (ASTM D790 at room temperature), an Izod impact of 1.36 ft-lb/in (ASTM D256), an elongation of >5%, and a glass transition temperature (tan δ) of approximately 128° C. The polymer showed a swelling in toluene of 91% (immersion for 24 hours at room temperature).

Example 47

Example 47 was conducted essentially as described above in Example 46, except that 5% elastomer (Kraton TM 1102) was included in the monomer streams and the boron trifluoride:tungsten catalyst ratio was 0.75. Physical tests on this elastomer-modified polymer gave a flexural modulus of 291,000 psi, a flexural strength of 10,270 psi, elongation >5%, Izod impact of 12 ft-lb/in, and a swelling in toluene of 109%.

Example 48

The RIM polymerization of Example 46 was repeated except omitting the boron trifluoride promoter and using the higher catalyst levels necessary to achieve a similar rate of polymerization in the mold (1300:1DCPD: tungsten catalyst and 6:1 tin hydride: tungsten catalyst (mole/mole)). The molded polymer showed a flexural modulus of 318,000 psi, a flexural strength of 8,900 psi, an elongation of 3.1%, and a swelling in toluene of 292%. Another plaque molded under these conditions showed a flexural modulus of 307,000 psi, a flexural strength of 8,500 psi, an elongation of 3.0% and an Izod impact of 0.70 ft-lb/in. A molded plaque incorporating 5% Kraton TM 1102 elastomer exhibited an Izod impact strength of 7.70 ft-lb/in, a flexural modulus of 270,000 psi and a flexural strength of 8,700 psi.

I claim:

1. A metathesis-polymerizable composition comprising
   (a) a tungsten compound which is the reaction product of a tungsten salt and a phenol;
   (b) from about 1 to about 15 moles, per mole of the tungsten compound, of an organo tin hydride which can be represented by the formula $Sn(R)_3H$, in which each R is selected independently from substituted or unsubstituted aryl and $C_{1-20}$ alkyl;
   (c) a boron halide present in an amount of from about 0.001 to about 10 moles per mole of the tungsten compound; and
   (d) a cyclic olefin having a norbornene moiety present in the composition in an amount within the range of 1000 to about 8000 moles per mole of the transition metal.

2. The composition of claim 1 in which component (a) is a reaction product of a tungsten salt and an alkyl-substituted phenol.

3. The composition of claim 2 in which the boron halide is present in the composition in an amount within the range of about 0.05 to about 2 moles per mole of the tungsten metal compound.

4. The composition of claim 1 in which the boron halide is selected from the group consisting of boron trihalides, boron trihalide complexes and tetrahaloborates.

5. The composition of claim 4 in which the tungsten salt comprises a compound selected from the group consisting of tungsten hexachloride and tungsten oxytetrachloride.

6. The composition of claim 5 in which the phenol is selected from the group consisting of t-butyl phenol, t-octyl phenol, nonyl phenol, 2,6-diisopropyl phenol and 2,6-di-tert-butyl-4-methylphenol.

7. The composition of claim 1 in which component (b) is a trialkyl tin hydride.

8. The composition of claim 7 in which component (a) is a reaction product of a tungsten salt and a phenol selected from the group consisting of 2,6-diisopropyl phenol and 2,6-di-tertbutyl-4-methylphenol.

9. The composition of claim 8 in which the boron halide is selected from the group consisting of boron tribromide, boron trifluoride etherate, boron trifluoride ethylamine and boron trifluoride butyrate.

10. The composition of claim 7 in which the trialkyl tin hydride is tributyltin hydride.

11. The composition of claim 1 in which the tungsten salt is a mixture of tungsten hexachloride and tungsten oxytetrachloride.

12. The composition of claim 11 in which the phenol is selected from halophenols and haloalkyl-substituted phenols.

13. The composition of claim 11 in which the boron halide is present in the composition in an amount within the range of about 0.05 to about 2 moles per mole of the tungsten compound.

14. The composition of claim 11 in which component (b) is an alkyl tin compound selected from the group consisting of tributyltin hydride, triphenyltin hydride and trioctyltin hydride.

15. A process comprising contacting, under reaction injection molding polymerization conditions, a cyclic olefin monomer having a norbornene moiety with a composition comprising (a) a tungsten compound which is the reaction product of a tungsten salt and a phenol; (b) from about 1 to about 15 moles, per mole of the tungsten compound, of an organo tin hydride which can be represented by the formula $Sn(R)_3H$, in which each R is selected independently from substituted or unsubstituted aryl and $C_{1-20}$ alkyl; and (c) a boron halide present in an amount within the range of about 0.01 to about 10 moles per mole of the tungsten compound, for a time sufficient to produce a solid polymeric molded article.

16. The process of claim 15 in which the cyclic olefin comprises dicyclopentadiene.

17. The process of claim 16 in which the boron halide is selected from the group consisting of boron trihalides, boron trihalide complexes and tetrahaloborates.

18. The process of claim 16 in which the organo tin hydride is selected from the group consisting of tributyltin hydride, triphenyltin hydride and trioctyltin hydride.

19. The process of claim 16 in which component (a) is a reaction product of at least one of tungsten hexachloride and tungsten oxytetrachloride and a compound selected from the group consisting of halophenols, alkyl-substituted phenols and haloalkyl-substituted phenols.

20. A process for in-mold polymerization of a cyclic olefin having a norbornene moiety which comprises
   (a) introducing into a mold a reaction mixture comprising the cyclic olefin, a catalyst comprising an aryloxy-substituted tungsten compound, from about 1 to about 15 moles per mole of the tungsten compound of a co-catalyst selected from organo tin hydride and organo aluminum halides, and from about 0.001 to about 10 moles of a boron halide, and
   (b) maintaining the reaction mixture under polymerization conditions for a time sufficient for polymerization of the cyclic olefin and formation of a molded article.

21. The process of claim 20 in which the boron halide is selected from the group consisting of boron trihalides, boron trihalide complexes, and boron tetrahaloborates.

22. The process of claim 20 in which the aryloxy-substituted tungsten compound is the reaction product of a tungsten salt and an alkyl-substituted phenol and the organo tin hydride is selected from the group consisting of tributyltin hydride, triphenyltin hydride and trioctyltin hydride.

23. The process of claim 20 in which the reaction mixture is introduced into a mold at an initial mold temperature within the range of about 20° to about 130° C.

24. The process of claim 20 in which the reaction mixture is the product of mixing a first stream comprising the aryloxy-substituted tungsten compound and a second stream comprising the organo tin hydride, wherein at least one of said first and second streams further comprises the cyclic olefin monomer and at least one of said first and second streams further comprises the boron halide.

25. The process of claim 24 in which the boron halide is present in the reaction mixture in an amount within the range of about 0.05 to about 2 moles per mole of the aryloxy-substituted tungsten compound.

26. The process of claim 24 in which the boron halide is selected from the group consisting of boron trifluoride, boron trifluoride etherate and boron trifluoride butyrate.

27. The process of claim 22 in which the transition metal salt is selected from the group consisting of tungsten hexachloride, tungsten oxytetrachloride and molybdenum oxytrichloride.

28. The process of claim 27 in which the alkyl-substituted phenol is selected from the group consisting of 2,6-diisopropyl phenol and 2,6-di-tert-butyl-4-methylphenol.

29. The process of claim 20 in which the cyclic olefin is selected from the group consisting of dicyclopentadiene, norbornene, norbornadiene and 5-(2-propenyl)-norbornene.

* * * * *